Patented Aug. 8, 1944

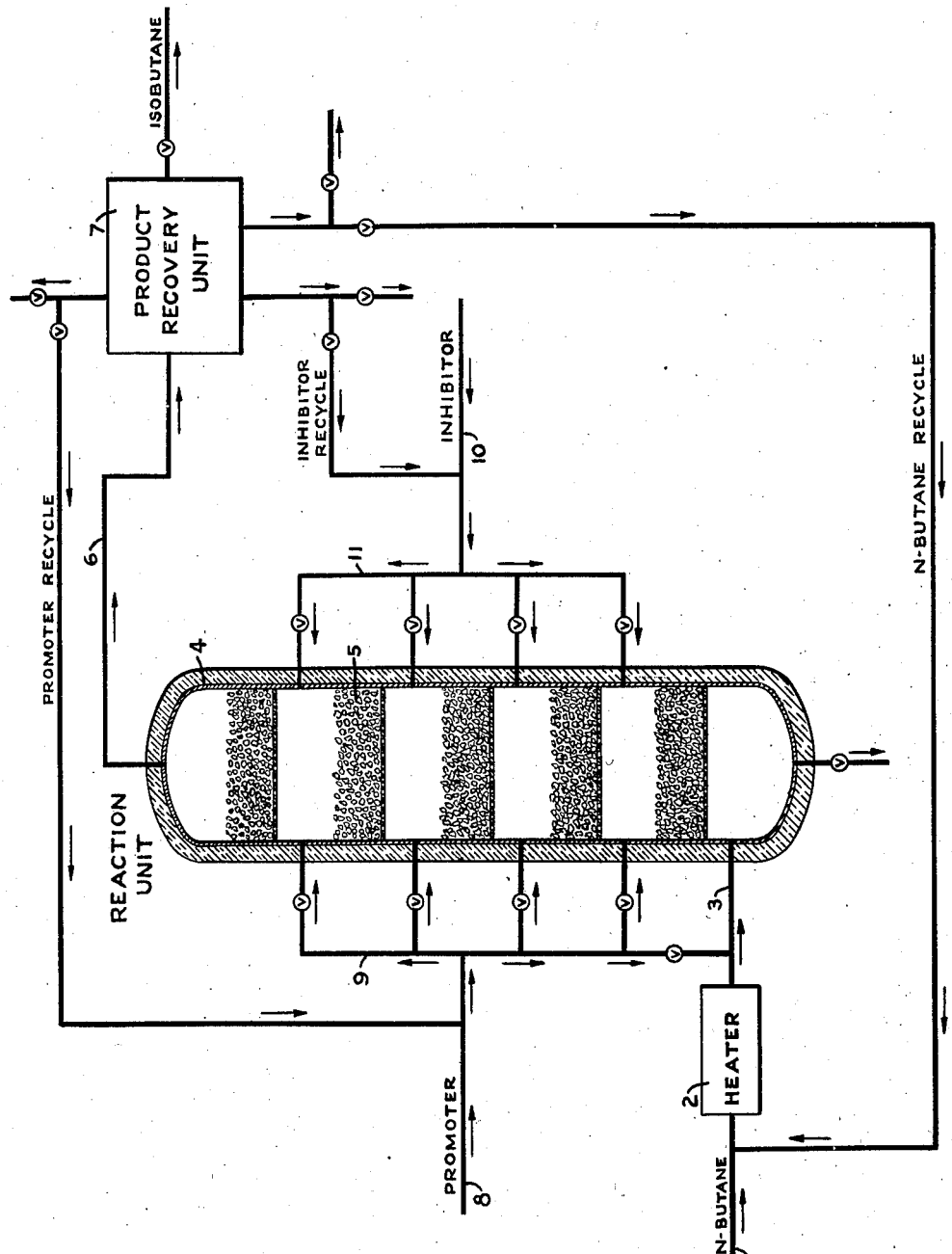

2,355,198

UNITED STATES PATENT OFFICE 2,355,198

CATALYTIC CONVERSION OF HYDROCARBONS

Harold V. Atwell, Beacon, N. Y., assignor to The Texas Company, New York, N. Y., a corporation of Delaware Application August 7, 1942, Serial No. 453,957

9 Claims. (Cl. 260—683.5)

This invention relates to the catalytic conversion of hydrocarbons and particularly to conversion reactions accompanied by the liberation of exothermic heat of reaction.

The invention has to do with a conversion process involving a conversion reaction such as isomerization wherein a feed hydrocarbon is passed through a substantial mass or body of conversion catalyst or through a plurality of such masses or bodies and undergoes conversion during such passage, the temperature of the hydrocarbon increasing as it passes through the catalyst due to heat liberated in the reaction. In accordance with the invention the temperature is permitted to rise within the reaction zone or zones in the direction of hydrocarbon flow and an agent to inhibit hydrocarbon cracking is injected in the region or regions of higher temperature.

More specifically the invention contemplates progressively increasing the concentration of the inhibiting agent in the direction of hydrocarbon flow through the reaction zone so as to substantially inhibit hydrocarbon cracking as the temperature rises. Suitable cracking inhibitors comprise hydrogen and low boiling naphthenes such as methyl and ethyl cyclobutane, cyclopentanes, and cyclohexanes, etc. Isobutane has been found effective as an inhibitor in the isomerization of a low boiling normally liquid gasoline hydrocarbon such as normal pentane and normal hexane. The inhibitor may be added in small increments at succeeding points in the reaction zone, the amount so added being correlated with the temperature of the reaction so as to inhibit the undesired cracking or side reactions.

The invention has application in conversion processes employing a solid catalyst maintained in a bed of substantial depth or in a plurality of relatively shallow beds of catalyst disposed in lumps, particles, powder or other fragmentary form. It also has application in the case of fluid catalyst operations where the hydrocarbon feed flows through a series of stages or zones containing a liquid or fluid catalyst. In either solid or liquid type catalyst operations the hydrocarbons may be subjected to the action of the catalyst while they are in either gas or liquid phase.

The invention is advantageously employed in the catalytic isomerization of hydrocarbons by the action of a catalyst comprising aluminum halide, aluminum halide-hydrocarbon complex, etc., activated with a promoter such as hydrogen chloride. It has been found that the isomerization of straight-chain paraffin hydrocarbons to form isoparaffin hydrocarbons by the action of aluminum chloride and hydrogen chloride is accompanied by the liberation of a substantial amount of heat, sufficient, in the case of normal butane, to produce a temperature rise of some 30 to 50° F. in the hydrocarbons as they pass through the reaction zone.

In the isomerization of normal butane with aluminum chloride and hydrogen chloride, for example, it has been found that the optimum reaction temperature is about 210° F. When the reaction temperature is maintained substantially above this point substantial cracking occurs as evidenced by the production of hydrocarbons of both lower and higher molecular weight than butane. Cracking is usually undesirable, particularly when employing as the catalyst aluminum halide in solid form since such cracking is accompanied by substantial deterioration of the catalyst.

Accordingly, an advantage of the present invention resides in permitting the temperature to rise in succeeding stages of the reaction zone due to liberation of exothermic heat of the reaction. Instead of removing the liberated heat from the reaction zone, provision is made for progressively adding an inhibitor of cracking as the temperature increases. In the case of a tower reactor containing a plurality of beds of solid catalyst, this may be accomplished by injection of hydrogen at succeeding points in the reaction tower. Advantageously the injected gas is at a temperature corresponding substantially to the temperature within the reaction tower at the point of injection. In this way, substantial reduction in temperature is avoided.

Likewise when effecting the reaction by passing the hydrocarbons in liquid phase through a liquid catalyst the inhibitor, i. e., hydrogen, isobutane, naphthenes, etc., is injected at succeeding points in the path of travel through a comparatively stationary body or bodies of the catalyst.

There is also a progressive increase in the volume of vapor or gas at succeeding points in the direction of flow of hydrocarbon through the reaction zone. As a result of this increased velocity of flow the time of contact between the hydrocarbons and the catalyst is progressively reduced at each succeeding point or stage in the direction of hydrocarbon flow. For example, the time of contact between feed hydrocarbon and catalyst in the first stage may be several times that in the final stage. The overall time of contact may be varied as desired. For example, in the case of isomerizing normal butane the time of contact may range from about one-tenth of a second to one minute or more.

By operating in the foregoing manner the temperature within the reaction zone is allowed to rise so that in the case of normal butane the temperature of initial contact between feed hydrocarbon and catalyst may be about 200°, while the temperature in the final stage of the reaction zone may be about 230 to 250° F. By employing a relatively high velocity of flow in the regions of higher temperature opportunity for the occurrence of undesired secondary reactions is substantially reduced due to the decreased time of exposure to the catalyst in this high temperature region. At the same time the presence of the inhibitor substantially inhibits such secondary or cracking reactions as would normally occur at these higher temperatures.

A further advantage of this process resides in avoiding the introduction of a cooling agent such as a portion of the cold feed to intermediate points of a reaction zone containing a solid or supported type of catalyst operating with the hydrocarbon in the gas phase. The introduction of a cooling agent to the reaction zone may give rise to difficulty in the case of aluminum chloride due to condensation of sublimed aluminum chloride vapors at the point at which cooling is supplied.

In accordance with the invention the process may be operated so as to obtain in the initial or first stage a moderate degree of reaction and in a subsequent or second stage a desired maximum degree of reaction. In addition to maintaining a relatively lower temperature in the first stage other conditions may also be modified. Thus, the concentration of the promoter may be relatively low within the first stage and may be progressively increased in subsequent stages in the direction of hydrocarbon flow therethrough. With sufficiently moderate operating conditions in the first stage no cracking inhibitor need be injected until a subsequent or the final stage of the process.

In order to describe the invention further, reference will now be made to the accompanying drawing comprising a flow diagram illustrating one mode of practicing the invention wherein a solid type of catalyst is used.

Normal butane from a source not shown is conducted through a pipe 1 to a heater 2 wherein it is heated to a temperature of about 200° F. The heated feed, advantageously in vapor phase, is then conducted through a pipe 3 to a reaction unit 4 wherein it is brought into contact with the catalyst as indicated. The reaction unit 4 advantageously comprises a vertical tower insulated against heat loss and containing a plurality of catalyst beds 5, the catalyst comprising solid aluminum chloride disposed in fragmentary form.

The pressure maintained within the reaction zone may be as high as possible in relation to the operating temperature without causing condensation of the hydrocarbon being treated.

It will be understood that the feed can be introduced to either the top or bottom of the reactor depending upon whether downward or upward flow through the reactor is desired.

As indicated in the drawing the feed hydrocarbon is introduced to the lower portion of the reaction tower and rises upwardly through each catalyst bed in succession undergoing conversion into isobutane as it passes therethrough. The converted and unconverted hydrocarbon is continuously drawn off from the top of the tower at a temperature of about 250° F. through a pipe 6 leading to a recovery unit 7 to which reference will be made later.

The promoter such as hydrogen chloride is introduced from a source not shown through a pipe 8 communicating with a pipe manifold 9 through the various branches of which the promoter may be introduced at a plurality of points in the tower. In this way provision may be made for introducing some promoter below each succeeding bed in the tower or below any individual bed as desired.

A suitable inhibitor of hydrocarbon cracking such as hydrogen may be introduced from a source not shown through a pipe 10 which likewise terminates in a pipe manifold 11 having a plurality of branches communicating with the tower. In this way some inhibitor may be introduced below each succeeding bed in the tower or below any individual bed as desired. For example, in actual operation the inhibitor may be introduced only to the spaces below the uppermost or two uppermost beds in the tower so that the feed hydrocarbon passes through the lower or lowermost beds in the absence of inhibiting material.

The recovery unit 7 to which reference has already been made may comprise various forms of apparatus including fractionating and scrubbing or extraction towers arranged so as to effect segregation of the reaction mixture received from the pipe 6 into its various components including promoter, inhibitor, reacted and unreacted hydrocarbons, the hydrocarbons in this instance comprising isobutane and normal butane.

The forms of apparatus suitable for effecting this segregation are now well known in the art so that it is thought unnecessary to describe them in specific detail.

Provision is made for recycling promoter, inhibitor and unreacted hydrocarbons as indicated in the drawing while the converted hydrocarbon, namely, isobutane, is withdrawn from the system.

The amount of hydrogen chloride promoter injected to the reaction tower may range from about 1 to 5% by weight of the normal butane feed, but usually amounts to about 2 to 3% by weight.

The amount of inhibitor injected to the reaction tower will depend largely upon the character of the particular inhibitor employed. Where hydrogen is injected the total amount of hydrogen may range from about 2 to 10% by weight of the feed hydrocarbon. When using a low boiling naphthene hydrocarbon such as cyclobutane or cyclopentane, as in the case where the hydrocarbons are undergoing isomerization in the liquid phase, the total amount of naphthene introduced to the reaction zone may range from 1 to about 25% by weight of the feed hydrocarbon and usually will amount to about 5 to 10% by weight. Advantageously, the inhibitor is heated and introduced at a temperature corresponding approximately to the temperature prevailing within the tower or reaction zone at the point of introduction.

When isomerizing gasoline hydrocarbons of higher molecular weight than normal butane, higher molecular weight naphthene hydrocarbons may be employed as the inhibiting agent. In any case the higher molecular weight naphthene hydrocarbons may be employed to advantage where a liquid or fluid catalyst is used such as a catalyst comprising aluminum halide-hydrocarbon complex containing free aluminum halide dissolved or suspended therein. When employing a fluid catalyst of this nature in accordance with the present invention the feed hydrocarbon advantageously bubbles upwardly through a liquid body of the catalyst, and a plurality of separate reaction vessels through which the feed hydrocarbon flows in succession may be used. In either case, the inhibitor may be injected in the reaction zone or zones at a plurality of successive points.

While certain naphthene hydrocarbons have been specified nevertheless it is contemplated that any naphthene hydrocarbon having from about 3 to 20 carbon atoms per molecule may be used as an inhibitor of hydrocarbon cracking in the reaction.

Other inhibiting agents may be employed, for example, when isomerizing gasoline hydrocarbons such as normal pentane, hexane or heptane, isobutane has been found effective as an inhibitor for cracking. In such case the total amount of isobutane injected to the reaction zone may be substantially more than a molecular equivalent of the feed hydrocarbon.

While a single reaction tower has been described in the vapor phase operation illustrated in the drawing, nevertheless it is contemplated that a plurality of separate towers may be employed through which the hydrocarbons flow in series.

Where a solid catalyst mass is used through which the hydrocarbons flow in vapor phase it is desirable to maintain a high rate of fluid flow through the catalyst mass. Advantageously this flow should be such that the modified Reynolds number will exceed about 40 and is preferably in the range about 100 to 200. The modified Reynolds number may be determined by reference to the data in an article entitled "Effect of pressure on viscosity of normal butane and isobutane," published by Sage, Yale and Lacey, Industrial Engineering Chemistry, February, 1939, vol. 1, No. 2, pages 223–226, and as co-related in a subsequent article entitled "Viscosity of gas and vapors at high pressures," published by Comings and Egly, Industrial Engineering Chemistry, vol. 32, No. 5, pages 714–718.

As previously mentioned it is advantageous to maintain a relatively higher space velocity in that part of the process where higher reaction temperatures prevail as a result of the exothermic heat of reaction. This increase in space velocity may be facilitated by employing a reaction zone of progressively decreasing cross-sectional area in the direction of fluid flow therethrough. If desired in the initial stages the feed may be split and caused to flow in parallel through parallel reaction towers and the effluent hydrocarbons from these two towers commingled and passed through a single reaction tower comprising the final stage.

Various metallic halide catalysts other than aluminum chloride may be employed, such as aluminum bromide, zirconium chloride, beryllium chloride, titanium tetrachloride, stannic tetrachloride, antimony chloride, mixtures of halides such as AlCl3-SbCl3, AlCl3-NaCl, etc. The catalysts may be supported upon various solid adsorbent materials such as alumina, charcoal, etc.

Suitable promoters other than hydrogen chloride may be hydrogen bromide, hydrogen iodide, hydrogen fluoride, carbon tetrachloride, alkyl, aryl or acyl halides or any substance capable of liberating hydrogen halide after coming into contact with the metallic halide catalyst.

Obviously many modifications and variations of the invention, as hereinbefore set forth, may be made without departing from the spirit and scope thereof, and therefore only such limitations should be imposed as are indicated in the appended claims.

I claim:

1. In the process of isomerizing a feed hydrocarbon to convert it into more highly branched chain hydrocarbons by catalytic conversion, the method comprising passing the feed hydrocarbon from inlet to outlet through an elongated substantially adiabatic reaction zone containing a conversion catalyst maintained under conditions such that isomerization of the feed hydrocarbon constitutes the principal reaction, maintaining a temperature gradient through the reaction zone, the temperature increasing in the direction of hydrocarbon flow due to exothermic heat of reaction, removing the hydrocarbon reaction products from said outlet after passage through the catalyst at a temperature substantially above the temperature at said inlet, injecting to said reaction zone at a plurality of succeeding points intermediate the points of hydrocarbon inlet and outlet a cracking inhibiting agent, and correlating the amounts so injected with the temperature of the reaction whereby hydrocarbon cracking is substantially inhibited as the temperature rises throughout the reaction zone.

2. In the process of isomerizing a feed hydrocarbon to convert it into more highly branched chain hydrocarbons by catalytic conversion, the method comprising passing the feed hydrocarbon through an elongated reaction zone containing a substantial mass of catalyst maintained under isomerizing conditions of temperature whereby isomerization constitutes the principal reaction, maintaining a temperature gradient through the reaction zone, the temperature increasing in the direction of hydrocarbon flow therethrough due to exothermic heat of reaction, removing the hydrocarbon reaction products after passage through the catalyst mass and progressively diluting the hydrocarbons as they advance through the reaction zone with a cracking inhibitor whereby hydrocarbon cracking is substantially inhibited, the progressive amounts of inhibitor being added at a temperature corresponding approximately to the temperature prevailing within the reaction zone at the point of addition.

3. The method according to claim 2 in which the catalyst comprises aluminum halide promoted with hydrogen halide.

4. In the process of isomerizing a feed hydrocarbon to convert it into more highly branched chain hydrocarbons by catalytic conversion, the method comprising heating a feed hydrocarbon consisting essentially of normal butane to a conversion temperature, introducing the heated hydrocarbons to one end of an elongated substantially adiabatic catalytic reaction zone containing a substantial body of catalyst maintained under conditions such that isomerization constitutes the principal reaction, passing the feed hydrocarbon through the catalyst whereby isomerization takes place, permitting the temperature of the reaction zone to increase in the direction of hydrocarbon flow due to exothermic heat of reaction, removing the hydrocarbon reaction products from an end of the reaction zone remote from the point of entry of the heated feed hydrocarbon, and introducing a cracking inhibitor into the reaction zone at a plurality of succeeding points intermediate the inlet of the heated hydrocarbon and the exit of the reaction products such that hydrocarbon cracking is substantially inhibited as the temperature increases.

5. The method according to claim 4 in which the catalyst comprises aluminum halide promoted with hydrogen halide.

6. In the process of isomerizing a low boiling normally liquid gasoline hydrocarbon to convert it into more highly branched chain hydrocarbons by catalytic conversion, the method comprising heating the feed hydrocarbon to a conversion temperature, introducing the heated hydrocarbon to one end of an elongated substantially adiabatic catalytic reaction zone containing a substantial mass of catalyst maintained under conditions such that isomerization constitutes the principal reaction, passing the feed hydrocarbon through the catalyst whereby isomerization takes place, permitting the temperature of the reaction zone to increase in the direction of hydrocarbon flow due to exothermic heat of reaction, removing the hydrocarbon reaction products from an end of the reaction zone remote from the point of entry of the heated feed hydrocarbon, introducing isobutane into the reaction zone at a plurality of succeeding points intermediate the inlet of the heated hydrocarbon and the exit of the reaction products such that hydrocarbon cracking is substantially inhibited in the reaction zone.

7. The method according to claim 6 in which the isobutane is introduced at substantially the temperature of the interior of the reaction zone adjacent the point of introduction.

8. In the catalytic isomerization of hydrocarbons wherein a stream of hydrocarbon is passed through an elongated substantially adiabatic reaction zone containing a substantial mass of conversion catalyst, the hydrocarbons undergoing isomerization during passage through the catalyst mass and the temperature of the hydrocarbons is increased as they pass therethrough from inlet to outlet of the reaction zone due to the exothermic heat of the conversion reaction, the improvement which comprises injecting an inhibitor of hydrocarbon cracking at a plurality of succeeding points in the reaction zone between said inlet and outlet, and progressively increasing the concentration of said inhibitor as the temperature increases.

9. In the catalytic isomerization of hydrocarbons wherein a stream of hydrocarbon is passed through an elongated substantially adiabatic reaction zone containing a substantial mass of conversion catalyst, the hydrocarbons undergoing isomerization during passage through the catalyst mass and the temperature of the hydrocarbons is increased as they pass therethrough from inlet to outlet of the reaction zone due to the exothermic heat of the conversion reaction, the improvement which comprises injecting an inhibitor of hydrocarbon cracking at a plurality of succeeding points in the reaction zone between said inlet and outlet and correlating the amount injected with the increasing temperature of the reaction so as to substantially inhibit hydrocarbon cracking during the course of the reaction.

HAROLD V. ATWELL.